(No Model.)
T. J. COLLINS.
STAND PIPE.
No. 362,610. Patented May 10, 1887.
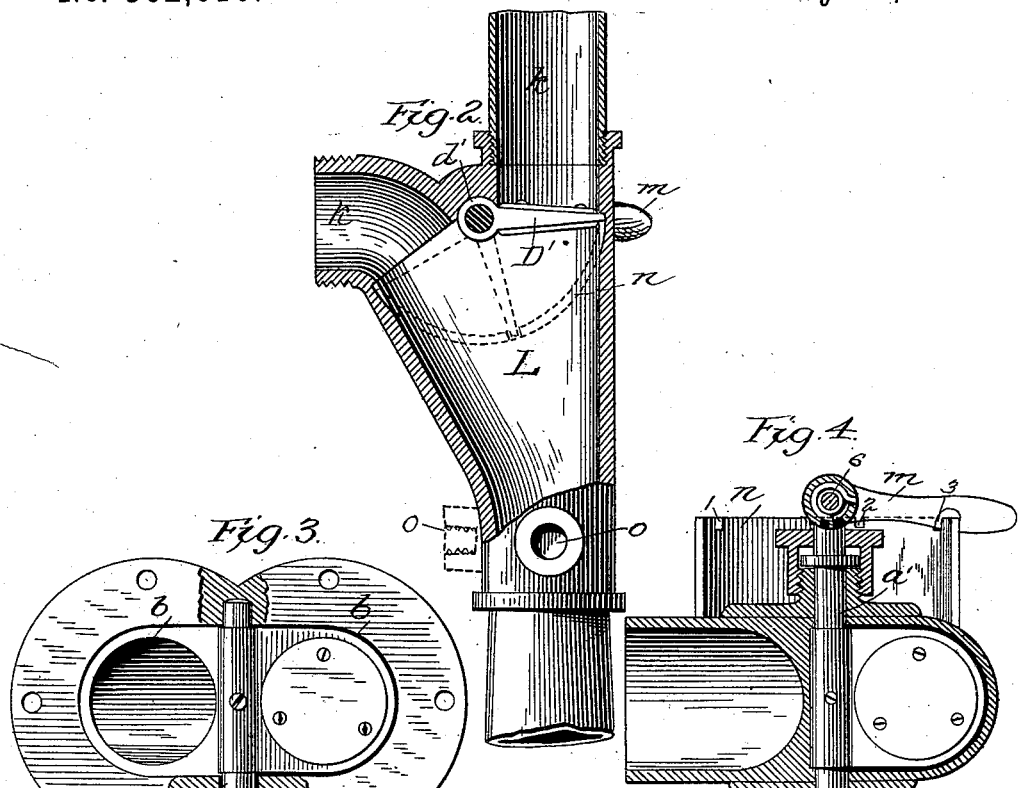
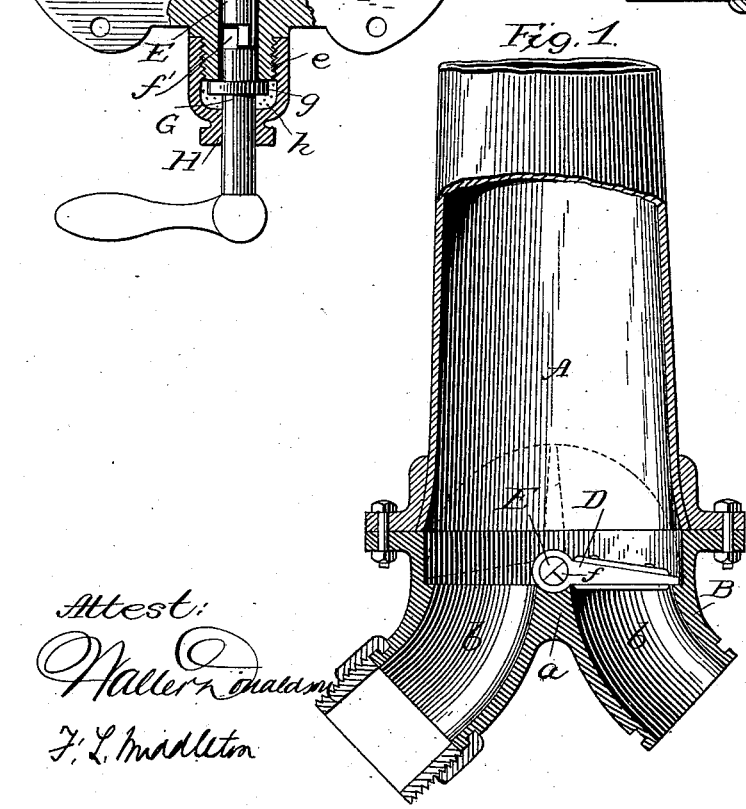
Attest:
Haller Donaldson
F. L. Middleton
Inventor
Thomas J. Collins
by Ellis Spear
Atty.

UNITED STATES PATENT OFFICE.

THOMAS J. COLLINS, OF WASHINGTON, DISTRICT OF COLUMBIA, ASSIGNOR OF ONE-HALF TO ALEXANDER B. BURNS, OF SAME PLACE.

STAND-PIPE.

SPECIFICATION forming part of Letters Patent No. 362,610, dated May 10, 1887.

Application filed September 18, 1886. Serial No. 213,940. (No model.)

*To all whom it may concern:*

Be it known that I, THOMAS J. COLLINS, of Washington, in the District of Columbia, have invented a new and useful Improvement in Stand-Pipes; and I do hereby declare that the following is a full, clear, and exact description of the same.

My invention relates to stand-pipes of that class which are applied to tall buildings and adapted to be connected at the base with the hose of a fire-engine, for the purpose of conducting water for the higher parts of the building; and it consists in details of construction, as hereinafter explained.

In the accompanying drawings, Figure 1 shows in vertical section, taken centrally through the pipes, its lower branches at right angles to the stem on which the pipe turns. Fig. 2 shows a similar section of the upper branch and valve. Fig. 3 is a horizontal section of Fig. 1. Fig. 4 is a horizontal section of Fig. 2, this view showing Fig. 2 inverted. Fig. 5 is a view of the pipe detached.

The part represented in Fig. 1 shows what is sometimes called the "Y," or branched part of the stand-pipe. This consists of a connection for the pipe, whereby a union is made between it and the hose-pipes connecting with the engines. Heretofore such unions have been made with branches for the hose-connections and with the valve for the branches where they unite with the main pipe, for closing one branch and relieving the engine from back-pressure, or for opening both branches and allowing both engines to work upon the stream. In this part of my invention I have sought, by a simple construction, to provide for the closing of either of the pipes, and also so to shape the main part of the coupling in its relation to the branches that when both branches are opened the streams therefrom shall unite in the main part of the connection without collision or interference with each other, and shall flow smoothly together. For this purpose I form the main part of the union (marked A) of a long pipe flattened, as shown in section in Fig. 3 and in Fig. 5, the longer diameter thereof being a little more than twice the shorter diameter. To the lower end of this pipe is a casting, B, which forms the other part of the union. This is formed of two or more branches, *b b*, which diverge sufficiently to allow the hose to be attached thereto, but which turn at their junction with the chamber of the part A, so that their walls will be approximately parallel and in line with the walls of the coupling A. At the apex of the wall *a*, which separates the branches, is pivoted the valve D, on a suitable spindle, E, having its bearing in the exterior walls of the casting. A seat is formed in the casting for the valve, as shown in Fig. 1, whereon it rests in nearly horizontal position as the pipe stands. The valve D is thus seated over the ends of both branches and may be turned to cover either the one or the other; but when both branches are used for forcing water the valve stands in a vertical position and forms an elongation of the wall *a*, projecting into the chamber of the main part A, and dividing it to form on each side a continuation of each branch. As the main part A is in lateral extent a little more than twice the diameter of each branch, this continuation is substantially the same extent in capacity as the branch itself. The valve is thinner toward the free end or edge, so that when in its vertical position it forms a continuation in the central portions of the valve of the surface of the divided wall between the two branches. By this construction streams are introduced from the branches into the main part of the union, and thus into the main pipe in a nearly parallel direction, and without any collision or eddy, whereby the force of the stream would be lessened.

The valve is adapted to operate automatically; but as such valves sometimes stick I have also provided mechanism whereby it may be turned by hand without interfering with its freedom of movement for automatic operation. The stem of the valve projects into a box, *e*, in the case of the casting, and is cut away at the end to a quarter-segment, *f*. A shank, G, of a wrench, provided with a collar, *g*, and with a quarter-segment, *f'*, on its end, is arranged in line with the spindle, as shown in Figs. 1 and 3. A cap, H, is fitted over the collar *g* with interposed packing *h* and holds the valve to its place. The quarter-segment allows the valve to turn through one-half circle, while the segment on the wrench is adapted forcibly to move the valve from one side to the other when necessary.

The upper part of a stand-pipe of the character described requires for its complete use branches such as shown at K, Fig. 2. From any of these branches water may be taken to any floor upon the building. I locate these branches in a casting, L, similar to that heretofore described, and shown in Fig. 1. The casting in itself forms an extension from the upper and lower connections of the main pipe, and also a connection for the branch pipe. The main part L of the casting is formed of a flattened connection, and, like the first described, is equal in its widest diameter to a little more than twice the diameter of the branches.

$k$ represents the extension of the casting, which forms the connection with the main section of the pipe at the upper end. Between it and K, on the edge of the divided wall $d'$, is located a valve, D', which swings in the chamber against the seats at the entrance of each branch, or may be held in an approximately central position, according to the direction of the streams, whether it be forced in one or both branches. As the valve in this case extends, when in the midway position, toward the current, it requires to be held in position. I therefore extend its shank $a'$ and provide it with a spring-handle, $m$, which snaps into notches 1 2 3 in the edge of the rim $n$ on the casting.

The handle $m$ is pivoted upon a pin, G, of the shank $a$, as shown in Fig. 4, and about this pin a spiral spring is placed, one end of which engages with the head of the handle and the other with the shank $a$. The rim $n$ is formed in an arc of a circle, and the notches 1 2 3 therein are formed in position to correspond with the several positions of the valve, as shown in dotted and full lines of Fig. 2. The handle is adapted to fit these notches, as shown in Fig. 4, and by grasping the end of said handle and moving it outward on its pivot 6 it may be turned to engage with any of the notches, as desired, the position of the handles indicating the position of the valve within the chamber.

In Figs. 2 and 4 the valve is shown as in a horizontal position, closing the main branch K, and therefore the handle $m$ also occupies a horizontal position, as shown. The rim $n$ is represented in dotted lines, Fig. 2. The valve, held open, divides the current and directs part to the branch and part to the main pipe.

Heretofore the branch pipes from the main have been provided with suitable valves for permitting or cutting off the flow of water thereto, and the only valve in the stand-pipe proper is that which is used at the top. When it is desired to use one of the branches below the top of the stand pipe, the only means for directing the water into the pipe was by closing the valve at the upper end of the stand-pipe, and the absence of any valve in the main pipe at the branch pipe used is a serious defect in stand-pipes as now constructed. In the ordinary construction, with only the valve at the top of the stand-pipe, the water under pressure flows not only through the branch which is left open, but beyond its junction with the main pipe up toward the top of the straight pipe, and as this pipe is closed at the top, under these circumstances, it will be observed that an air-chamber is formed, and so there is a continuous reaction formed by the compressed air acting upon the water, and this reaction is so great as to give severe shocks to the whole extent of the stand-pipe, and in some instances it has been known to shake the pipe from its fastenings. I avoid this by placing a valve in the stand-pipe proper at each junction with a branch pipe, and it will thus be seen that when it is desired to use a branch the valve shuts off communication with the part of the stand-pipe above the branch, and thus the compression of the air and its consequent reaction are prevented.

The two connections above described may be cast in the forms shown and fitted for connection with the main sections of the pipe. That shown in Figs. 1 and 3 has the upper part gradually tapering, but the chamber below is in cross-section, approximately equal to the areas of the ends of the branches which unite with the upper chamber. The form modified for the upper branch is made substantially on the same principle.

At $o$, I have shown the hollow internal threaded boss on the casting fitted to receive a bolt which serves as the round of a ladder, or to receive a rope or ladder to assist in climbing.

I claim as my invention—

1. In combination with the stand-pipe having branches, the elongated and tapering coupling A and branch pipes $b\ b$, the said coupling having its lower end approximately equal to the area of said branch pipes, its walls being substantially coincident with the walls of the branch pipes, which are approximately parallel at the junction, whereby the inflowing streams are caused to flow approximately parallel with each other at their entrance to the coupling, and are gradually commingled as they approach the small end of the coupling, substantially as described.

2. In combination with the stand-pipe having branches, the elongated and tapering coupling having its lower end approximately equal to the area of the branch pipes $b\ b$, the walls of the said branch pipes being approximately parallel at the junction and substantially coincident with the walls of the coupling, a valve arranged to form, when raised, a continuation of the dividing wall between the branch pipes, whereby the inflowing streams are caused to flow approximately parallel with each other at their entrance to the coupling, and are gradually commingled as they approach the small end of the coupling, substantially as described.

3. In combination with the main pipe having the enlarged chamber and with the branches, the pivoted valve and the wrench for operating said valve, with intermediate connections between the wrench and valve-stems, substantially as described, whereby the valve may turn independently of the wrench.

4. In combination with the stand-pipe, the enlarged chamber, the branch pipe K, the valve, and the spring-handle on its stem engaging with the notches of the rim $n$, all substantially as described.

5. In combination with the stand-pipe having branches and the pipes $b\ b$, the independent elongated and tapering coupling A between the said pipes $b\ b$ and the stand-pipe, said coupling having its lower end approximately equal to the area of the branches $b\ b$, whereby the inflowing streams are caused to flow approximately parallel with each other at their entrance to the coupling, and are gradually commingled as they approach the small end of the coupling, substantially as described.

6. In combination with the stand-pipe having branches and the branch pipes $b\ b$, the independent elongated and tapering coupling A, having its lower end flattened, substantially as described.

7. In combination with a stand-pipe and outlet-branch connected therewith, of the valve located in the main pipe and arranged above the junction of the branch therewith, substantially as described.

In testimony whereof I have signed my name to this specification in the presence of two subscribing witnesses.

THOMAS J. COLLINS.

Witnesses:
F. L. MIDDLETON,
WALTER DONALDSON.